UNITED STATES PATENT OFFICE.

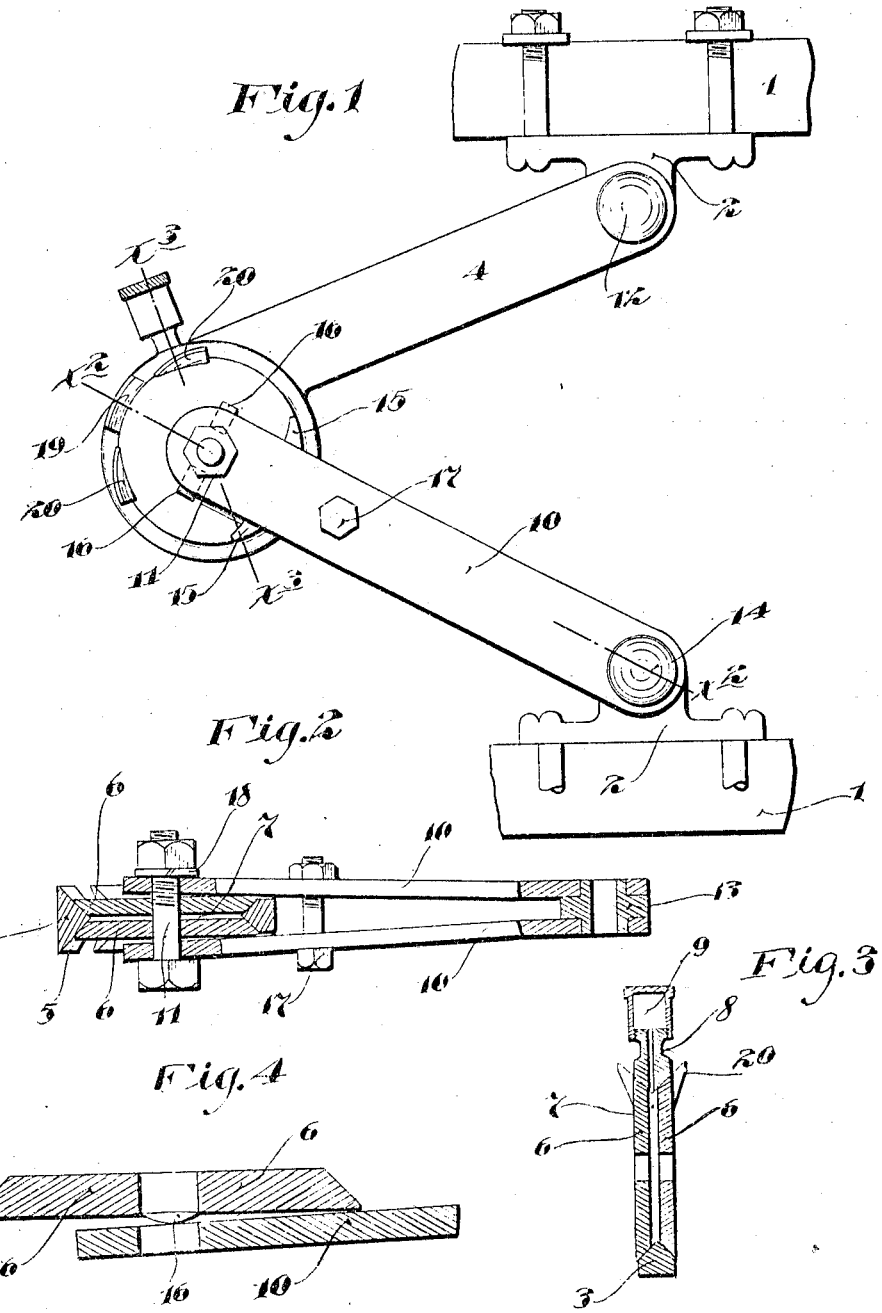

FRIDOLIN SCHIMMEL, OF FARIBAULT, MINNESOTA, ASSIGNOR TO SCHIMMEL, REID & COMPANY, OF FARIBAULT, MINNESOTA, A CORPORATION OF MINNESOTA.

SHOCK-ABSORBER.

1,048,743.

Specification of Letters Patent. Patented Dec. 31, 1912.

Application filed January 29, 1912. Serial No. 674,016.

*To all whom it may concern:*

Be it known that I, FRIDOLIN SCHIMMEL, a citizen of the United States, residing at Faribault, in the county of Rice and State of Minnesota, have invented certain new and useful Improvements in Shock-Absorbers; and I do hereby declare the following to be a full, clear, and exact description of the invention, such as will enable others skilled in the art to which it appertains to make and use the same.

My present invention has for its object to provide a simple and highly efficient shock absorber, especially adapted for use in connection with automobiles, and to such ends, generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a view in side elevation showing the shock absorber connected to the upper and lower members of an elliptical spring some parts being broken away; Fig. 2 is a transverse section taken on the line $x^2$ $x^2$ on Fig. 1; Fig. 3 is a transverse section taken on the line $x^3$ $x^3$ on Fig. 1; and Fig. 4 is a detail view in section showing certain of the parts of the shock absorber, portions being broken away.

This improved shock absorber may be applied in various different ways, between spring connected parts or members, but for the purpose of illustration, it is shown as directly connected between the upper and lower members 1 of an ordinary elliptical, or double elliptical spring, the said spring member, for such purpose, being shown as provided with rigidly clamped laterally offset lugs 2.

The shock absorber comprises a friction hub preferably in the form of a ring 3 having a projecting arm 4 and conical friction surfaces 5 that flare outwardly in reverse directions. Otherwise stated, the internal friction surface of the hub 3 is approximately V-shaped in transverse cross section. The reversely flaring conical friction surfaces 5 are engaged by friction disks 6 formed with conical surfaces that closely engage the said conical friction surfaces 5.

The inner faces of the friction disks 6 are spaced apart so as to afford a chamber 7 for containing a lubricant such as hard oil, and which lubricant is delivered into the said chamber through a hollow neck or nipple 8 shown as formed integral with and projected upward from the hub 3. An inverted oil cup 9 has screw-threaded engagement with the upper end of the neck 8 and is adjustable thereon, so as to force downward the hard oil contained therein, through the neck 8 and into the oil chamber 7. The arm 4 of the hub 3 constitutes one arm of a toggle, and the other arm of said toggle is afforded by a pair of laterally spaced metal strips or bars 10, preferably constructed from spring tempered steel. At one end, the laterally spaced members of the arms 10 embrace the hub 3 and friction disks 6 and are connected to the said disks by a nut equipped bolt 11 passed through and axially through the said disks. At its free end, the arm 4 is pivotally connected at 12 to one of the lugs 2, and the divided, or two-part spring arm 10, at its free end, is provided with a spacing thimble 13 that is pivotally connected to the other lug 2 at 14. As already indicated, the toggle arms 4 and 10 instead of being indirectly connected to the frictional body and to a relatively fixed part of the running gear, indirectly through the upper and lower portions of the spring 1, might be directly and independently connected to the said relatively movable spring connected parts.

To cause the friction disks 6 to move pivotally with the two-part arm 10, they are shown as provided with laterally projecting lugs 15 between which the laterally spaced members of said arms 10 press the friction disk into frictional engagement with the reversely flaring conical friction surfaces 5 of the hub 3, and preferably, they bear directly against diametrically extended bosses or ridges 16 formed on the outer faces of the said disks. A nut-equipped bolt 17 is passed through the intermediate portions of the spring members of the arms 10, preferably at a point quite close to the hub 3. By tightening the nut of the bolt 17, the frictional engagement or pressure between the disks 6 and hub 3 may be increased, at will, and conversely, the intensity of such frictional engagement may be decreased by loosening the nut on the bolt 17. The above noted frictional engagement may also be varied by tightening or loosening of the nut on the bolt 11. The said bolt 11 is not necessary for this purpose, but is provided chiefly as a simple and efficient pivotal device for holding the members of the spring arms 10 properly coupled to the friction disks 6. The best results are obtained by the use of bolts 17 for the above noted adjustment, because it acts yieldingly through the spring members of the said arms 10. This yielding action may, however, be also obtained, to a limited extent, by the use of a split spring washer 18 between the nut of the bolt 11 and the adjacent side or member of the spring arms 10.

In a shock absorber of the above character, it is desirable to obtain increased frictional resistance whenever the toggle arms 4 and 10 are given extreme movements by very intense shocks; and this I accomplish in a very simple and efficient way by providing the hub 3 with auxiliary friction surfaces formed on projecting lugs 19, and providing the disks 6 with coöperating auxiliary friction surfaces formed on projecting friction lugs 20. The friction surfaces of the said friction lugs 19 and 20 lie in the extended conical friction surfaces of the hub 3 and disks 6, and the lugs 20 are so spaced that they will be engaged with the coöperating lugs 19 only when the arms 4 and 10 are given extreme movements either toward or from each other. Furthermore, the lugs 20 are preferably increased in length in directions circumferentially away from the coöperating lugs 19, so that when the said lugs 20 are engaged with the lugs 19, the frictional resistance will be increased in proportion to the amount of extreme movement given to the toggle arms 4 and 10 either toward or from each other.

What I claim is:

1. A shock absorber comprising a pair of arms connected to act as a toggle, one of said arms having a hub with reversely flaring conical friction surfaces, and the other of said arms having connected for movement therewith, elements with reversely flaring conical friction surfaces engaging the reverse conical surfaces of said hub, said frictionally engaging members having auxiliary friction surfaces arranged to be engaged with increasing pressure by extreme movements of the said arms.

2. A shock absorber comprising a pair of arms connected to act as a toggle, one of said arms having a hub with reversely flaring conical friction surfaces, and the other of said arms being made up of laterally spaced members that embrace said hub, combined with disks connected to oscillate with the latter noted arm and having conical surfaces engaging the conical surfaces of said hub, and means applied to the intermediate portions of the members of said two-part arms for drawing the same together and thereby varying the intensity of the frictional contact between said disks and hub through a positive but yielding pressure.

3. A shock absorber comprising a pair of arms connected to act as a toggle, one of the said arms having a hub with friction surfaces, and the other of said arms being made up of laterally spaced bars embracing said hub, friction disks connected to oscillate with said two-part arm and engaging the friction surfaces of said hub, and means applied to the intermediate portions of the bars of said divided arms for drawing the same together to thereby yieldingly vary the intensity of the frictional engagement between said hub and disks, the said hub and disks having auxiliary friction surfaces arranged to be engaged only by extreme movements of the said arms in respect to each other.

In testimony whereof I affix my signature in presence of two witnesses.

FRIDOLIN SCHIMMEL.

Witnesses:
J. W. LE CRONE,
ROBERT MU.